(12) United States Patent
Glickstein et al.

(10) Patent No.: US 10,180,157 B1
(45) Date of Patent: Jan. 15, 2019

(54) TWO-PIECE CONNECTOR DEVICES, CONNECTOR ASSEMBLIES AND METHODS OF USE

(71) Applicant: Brunswick Corporation, Lake Forest, IL (US)

(72) Inventors: Jacob Glickstein, New Berlin, WI (US); Douglas John Martell, Oakdale, MN (US); Westin W. Nelson, Dayton, MN (US)

(73) Assignee: Brunswick Corporation, Mettawa, IL (US)

( * ) Notice: Subject to any disclaimer, the term of this patent is extended or adjusted under 35 U.S.C. 154(b) by 182 days.

(21) Appl. No.: 14/960,985

(22) Filed: Dec. 7, 2015

(51) Int. Cl.
| F16B 13/08 | (2006.01) |
| F16B 37/04 | (2006.01) |
| F16B 37/00 | (2006.01) |

(52) U.S. Cl.
CPC .............. F16B 37/04 (2013.01); F16B 13/08 (2013.01); F16B 13/0808 (2013.01); F16B 2037/007 (2013.01)

(58) Field of Classification Search
CPC .. F16B 13/0808; F16B 37/042; F16B 37/043; F16B 37/044
USPC .......................... 411/340, 344, 345, 172, 173
See application file for complete search history.

(56) References Cited

U.S. PATENT DOCUMENTS

| 2,346,712 | A | | 12/1938 | Tinnerman | |
| 2,315,359 | A | | 9/1939 | Tinnerman | |
| 2,567,372 | A | * | 9/1951 | Gelpcke | F16B 13/0808 411/342 |
| 3,211,042 | A | * | 10/1965 | Fischer | F16B 13/0808 411/344 |
| 3,389,631 | A | * | 6/1968 | Vaillancourt | F16B 13/0808 411/346 |
| 5,000,634 | A | | 3/1991 | Ducote | |
| 5,067,864 | A | * | 11/1991 | Dewey | F16B 13/002 411/340 |
| 5,176,482 | A | | 1/1993 | Reinl | |
| 5,645,384 | A | | 7/1997 | Wright et al. | |
| 5,678,939 | A | | 10/1997 | Ross | |
| 7,608,022 | B2 | | 10/2009 | Lull et al. | |

(Continued)

FOREIGN PATENT DOCUMENTS

DE    101 39 023    4/2003

OTHER PUBLICATIONS

Unpublished U.S. Appl. No. 14/664,302, filed Mar. 20, 2015.

*Primary Examiner* — Flemming Saether
(74) *Attorney, Agent, or Firm* — Andrus Intellectual Property Law, LLP

(57) ABSTRACT

A connector assembly includes a connector device and a base part provided with a mounting face that defines a throughhole having a forming wall structure for receiving a bolt and for receiving and retaining the connector device. The connector device has a rear portion and a front portion engaged together for movement relative to one another, the rear portion defining a threaded bolt hole for engaging the bolt extending through the throughhole and having a driven element positioned thereon. The front portion defines an access opening for receiving the bolt. Engagement of the driven element moves the rear portion relative to the front portion such that the bolt hole is aligned with the access opening and receives a threaded end of the bolt.

25 Claims, 12 Drawing Sheets

(56) References Cited

U.S. PATENT DOCUMENTS

| | | | |
|---|---|---|---|
| 7,828,501 B2* | 11/2010 | Bauer | ................ F16B 13/0808 |
| | | | 411/258 |
| 7,892,155 B2 | 2/2011 | Pearson et al. | |
| 8,083,450 B1* | 12/2011 | Smith | ................ F16B 37/0842 |
| | | | 411/111 |
| 8,303,225 B2* | 11/2012 | Kearl | ................... A47G 1/1633 |
| | | | 411/342 |
| 8,388,290 B2* | 3/2013 | Wiggins | ............. F16B 13/0808 |
| | | | 411/342 |
| 8,807,898 B2 | 8/2014 | Nelson et al. | |
| 2004/0096290 A1 | 5/2004 | Birnbaum | |
| 2007/0054785 A1 | 3/2007 | Drechsler | |
| 2009/0103999 A1* | 4/2009 | Fucito | ................ F16B 13/0808 |
| | | | 411/342 |
| 2011/0296773 A1 | 12/2011 | Kellerman | |

* cited by examiner

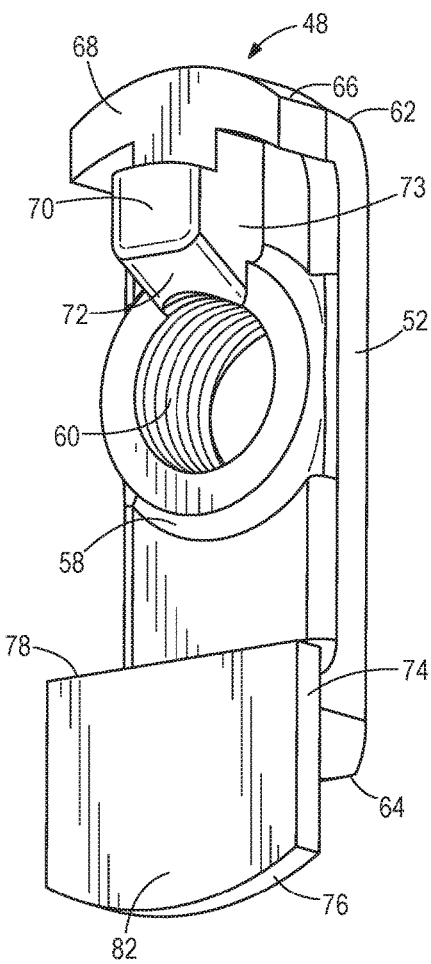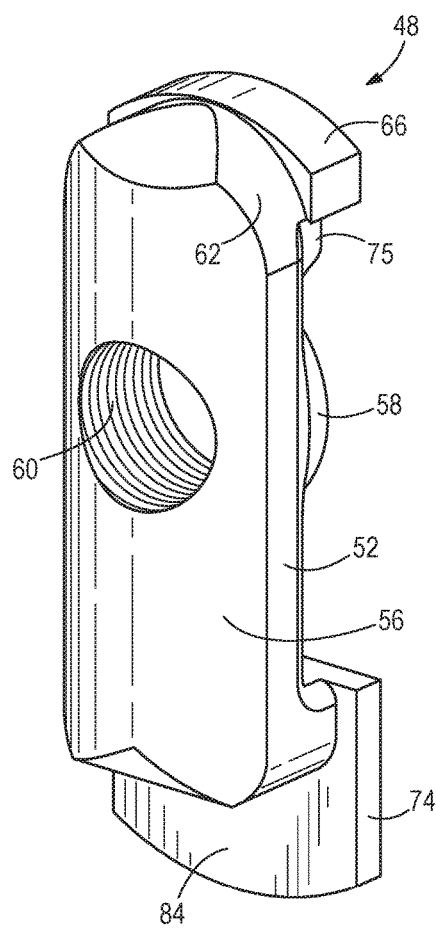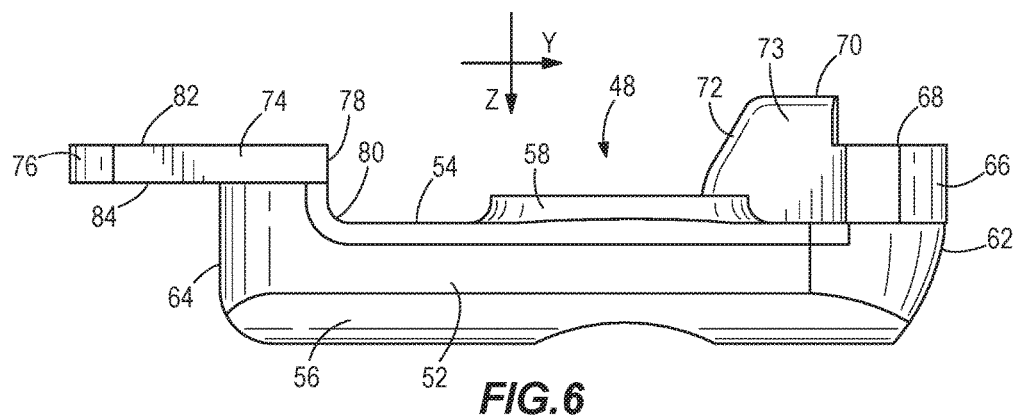

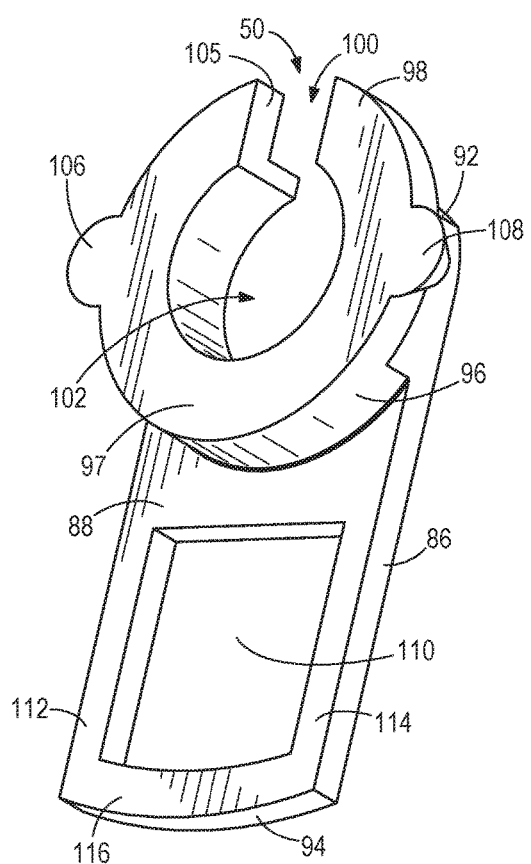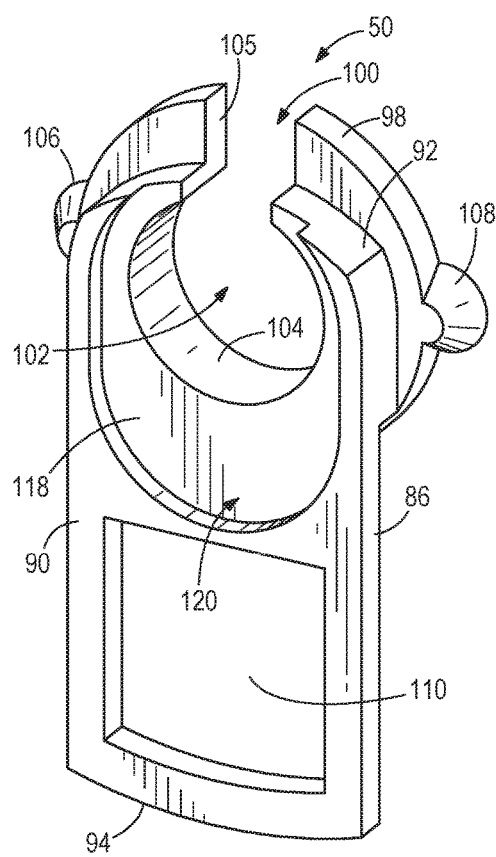
FIG. 7    FIG. 8
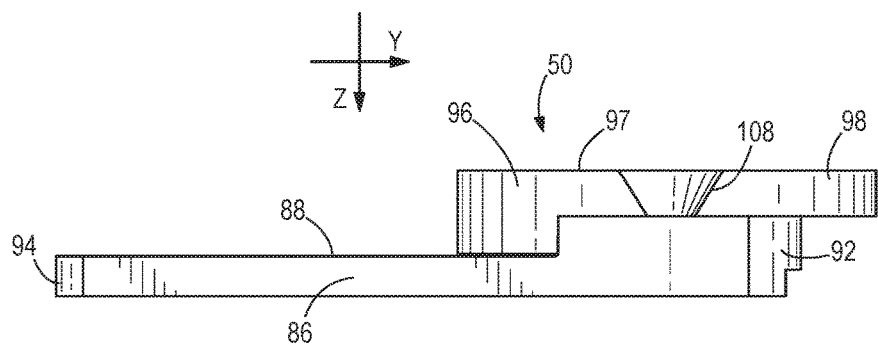
FIG. 9

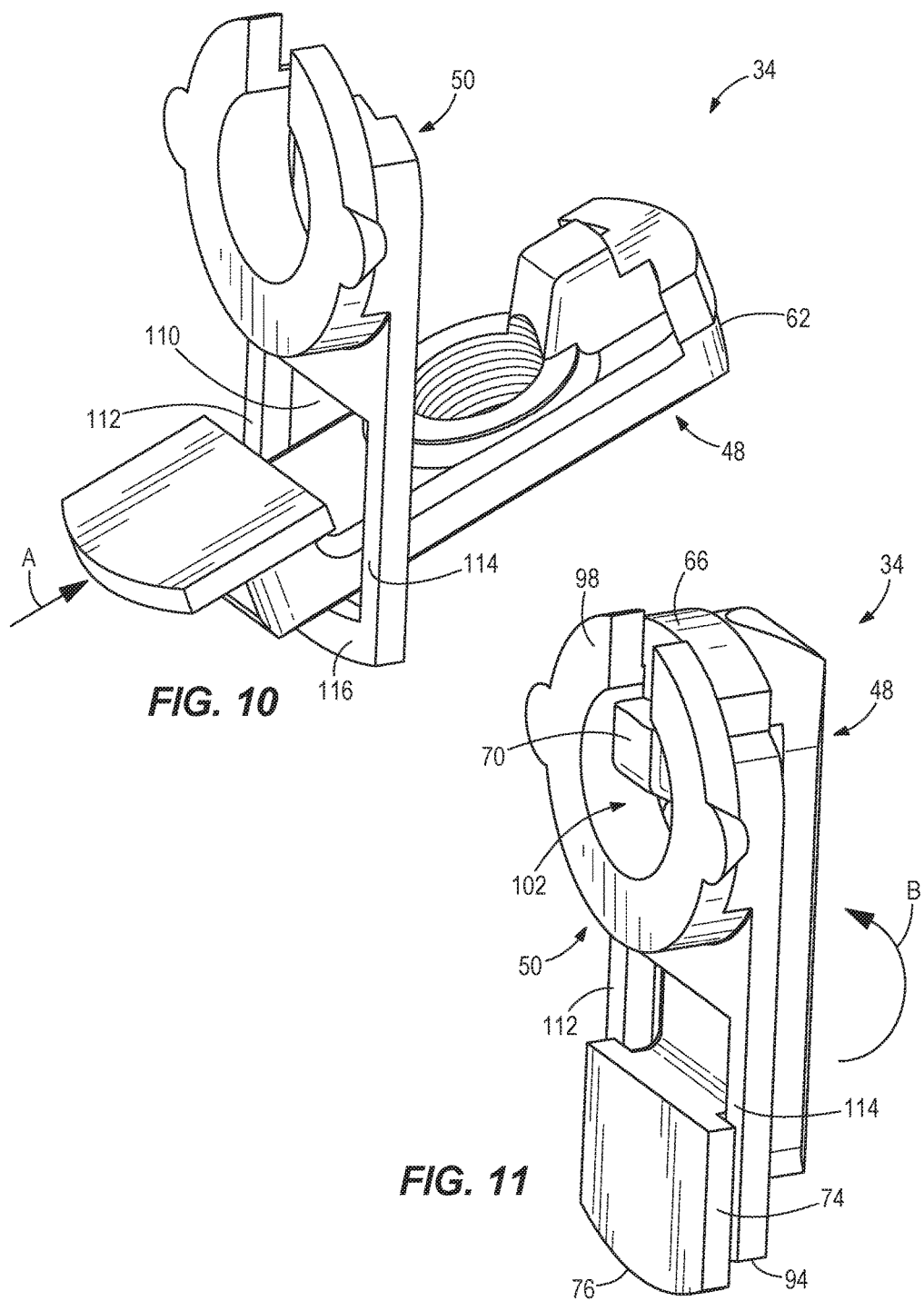

TWO-PIECE CONNECTOR DEVICES, CONNECTOR ASSEMBLIES AND METHODS OF USE

FIELD

The present disclosure relates to connector devices and assemblies. The illustrated embodiments relate to exercise equipment and connector devices and assemblies for connecting components of exercise equipment. This disclosure is applicable to other types of apparatus in addition to exercise equipment.

BACKGROUND

U.S. Pat. No. 8,807,898 which is herein incorporated by reference in entirety, discloses a connector assembly comprising a base part that defines a throughhole for receiving a bolt and also defines an aperture for receiving a device having a first end that fits through the aperture in the base part, and a second end that does not fit through the aperture in the base part. The first end of the device defines a bolt hole for engaging with a bolt extending though the throughhole in the base part. The second end of the device comprises opposing outer surfaces that engage the base part and thereby prevent the device from passing completely through the aperture, and also align the bolt hole in the device with the throughhole in the base part when the first end of the device is inserted into the aperture.

U.S. patent application Ser. No. 14/664,302 filed Mar. 20, 2015 which is herein incorporated by reference in entirety, discloses a connector assembly comprising a one-piece connector device, and a base part that defines a throughhole having a forming wall structure for receiving a bolt and for receiving the connector device. The connector device has a rear portion that fits through the throughhole in the base part, and a front portion which does not fit through the throughhole in the base part. The rear portion of the connector device defines a bolt hole for engaging the bolt extending through the throughhole in the base part. The front portion of the connector device defines an access opening aligned with the bolt hole in the rear portion for receiving the bolt. The rear portion is configured with engagement structure aligned with and engaged in abutting relationship with the forming wall structure upon movement of the connector device relative to the throughhole in the base part.

SUMMARY

This summary is provided to introduce a selection of concepts that are further described herein below in the detailed description. This summary is not intended to identify key or essential features of the claimed subject matter, nor is it intended to be used as an aid in limiting the scope of the claimed subject matter.

In some examples, connector assemblies comprise a connector device and a base part provided with a mounting face that defines a throughhole having a forming wall structure for receiving a bolt and for receiving and retaining the connector device. The connector device has a rear portion and a front portion engaged together so that the rear portion and the front portion both fit into the throughhole in the base part. The front portion and the forming wall structure are configured to retain the front portion and the rear portion within the base part such that the connector device does not project beyond the mounting face of the base part.

In other examples, connector assemblies include a connector device and a base part that defines a mounting face provided with a throughhole having forming wall structure for receiving a bolt having a threaded end and for receiving and retaining the connector device within the base part. The connector device has a rear portion and a front portion engaged together for movement relative to one another. The rear portion defines a bolt hole for engaging the bolt extending through the throughhole and has a driven element positioned thereon. The front portion defines an access opening for receiving the bolt. Engagement of the driven element moves the rear portion relative to the front portion such that the bolt hole is aligned with the access opening and receives the threaded end of the bolt.

In further examples, connector devices are provided for connecting an element to a base part including a mounting face provided with a throughhole having a forming wall structure via a bolt having a threaded end extending through the throughhole. The connector devices each comprise a rear portion defining a bolt hole for engaging the bolt extending through the throughhole. A front portion is engaged together with the rear portion such that there is relative movement between the rear portion and the front portion, the front portion having an access opening for receiving the bolt. The rear portion and the front portion are configured to fit into the throughhole and to be retained within the base part such that the rear portion does not project from the mounting face of the base part. The rear portion is movable relative to the front portion such that the bolt hole is aligned with the access opening for receiving the threaded end of the bolt.

In additional examples, there is disclosed a method of connecting an element via a bolt to a base part provided with a mounting face having a throughhole defined by forming wall structure. The method includes the steps of a) providing a connector device having a rear portion engaged together with a front portion, wherein the rear portion defines a bolt hole and the front portion defines an access opening configured to be aligned with the bolt hole; b) inserting the rear portion and the front portion into the throughhole; c) engaging the front portion with the forming wall structure of the throughhole such that the rear portion is retained within the base part without projecting from the mounting face of the base part; and d) inserting the bolt through the element and the access opening and turning the bolt into threaded connection with the bolt hole to secure the element to the base part, wherein the rear portion is configured for movement relative to the front portion such that the bolt hole is movable into alignment with the access opening.

In still further examples, connector assemblies include a connector device and a base part provided with a mounting face that defines a throughhole having a forming wall structure for receiving a bolt and for receiving the connector device. The connector device has a rear portion and a front portion engaged together for movement relative to one another so that the rear portion fits into the throughhole and at least an inner portion of the front portion fits into the throughhole. An outer portion of the front portion rests upon and projects from the mounting face.

BRIEF DESCRIPTION OF THE DRAWINGS

Examples of connector devices and assemblies are described with reference to the following figures. The same numbers are used throughout the figures to reference light features and components.

FIG. 4 is a right front perspective view of a rear portion of a connector device for the connector assembly.

FIG. 5 is a rear view of the rear portion of the connector device shown in FIG. 4.

FIG. 6 in an elevational view of the rear portion of the connector device shown in FIG. 4.

FIG. 7 is a right front perspective view of a front portion of the connector device for the connector assembly.

FIG. 8 is a rear view of the front portion of the connector device shown in FIG. 7.

FIG. 9 is an elevational view of the front portion of the connector device shown in FIG. 7.

FIGS. 10 and 11 are perspective views illustrating the operative engagement between the front and rear portions of the connector device.

DETAILED DESCRIPTION OF THE DRAWINGS

In the present description, certain terms have been used for brevity, clearness and understanding. No unnecessary limitations are to be inferred therefrom beyond the requirement of the prior art because such terms are used for descriptive purposes only and are intended to be broadly construed. The different devices and assemblies described herein may be used alone or in combination with other devices and/or assemblies. Various equivalents, alternatives and modifications are possible within the scope of the appended claims.

Figure 1:
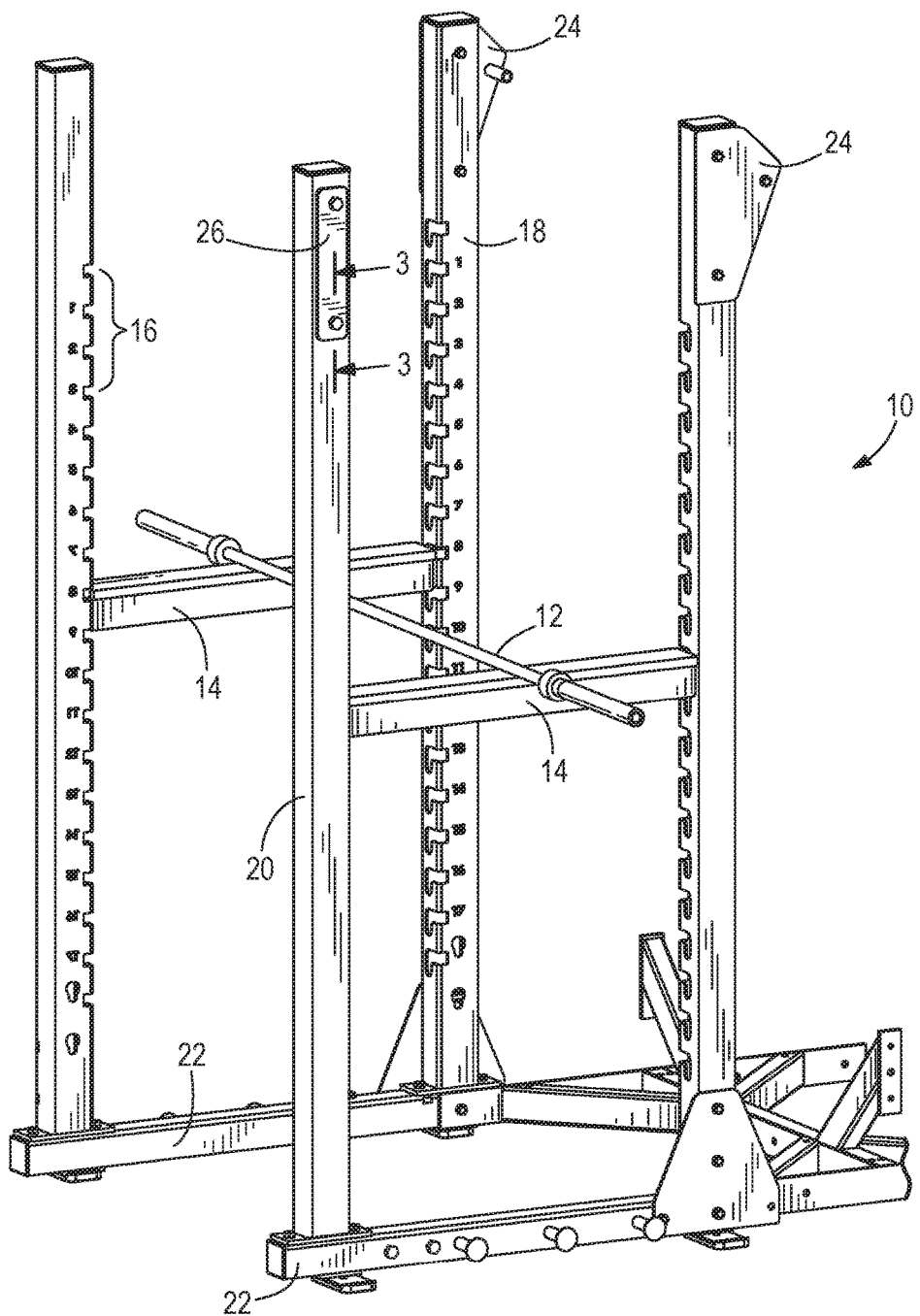
FIG. 1 is a perspective view of exercise equipment having an element secured thereto by a connector assembly according to the present disclosure.

FIG. 1 depicts exercise equipment 10 including among other things, a weight rack 10 and a weight bar 12. The weight rack 10 and the weight bar 12 are exemplary and provide only one of many examples of uses for the present invention. The present invention is applicable to other apparatuses and/or structural assemblies in addition to the weight rack 10 shown in FIG. 1. The weight bar 12 is shown supported on the weight rack 10 via a pair of cross support members 14 which are releasably fixable to different vertical locations (e.g. 16) to thereby allow a user to select the vertical height at which the weight bar 12 is supported above the ground. The cross support members 14 are attached to respective front and rear support columns 18, 20 which vertically extend above and are supported by base frame members 22. First auxiliary support elements 24 are attached by prior art connector assemblies to support columns 18 for attachment of additional exercise equipment (not shown) such as, for example, chin-up assemblies. In the example shown, a second auxiliary support element 26 in the form of a rectangular plate is attached to support column 20 for further attachment of additional exercise apparatus (not shown) by a connector assembly according to the present disclosure. Again, the weight rack 10 shown in the figures is exemplary, and the present invention can be used to connect structural members and other types of structural apparatus besides the exercise equipment shown in FIG. 1.

Figure 2:
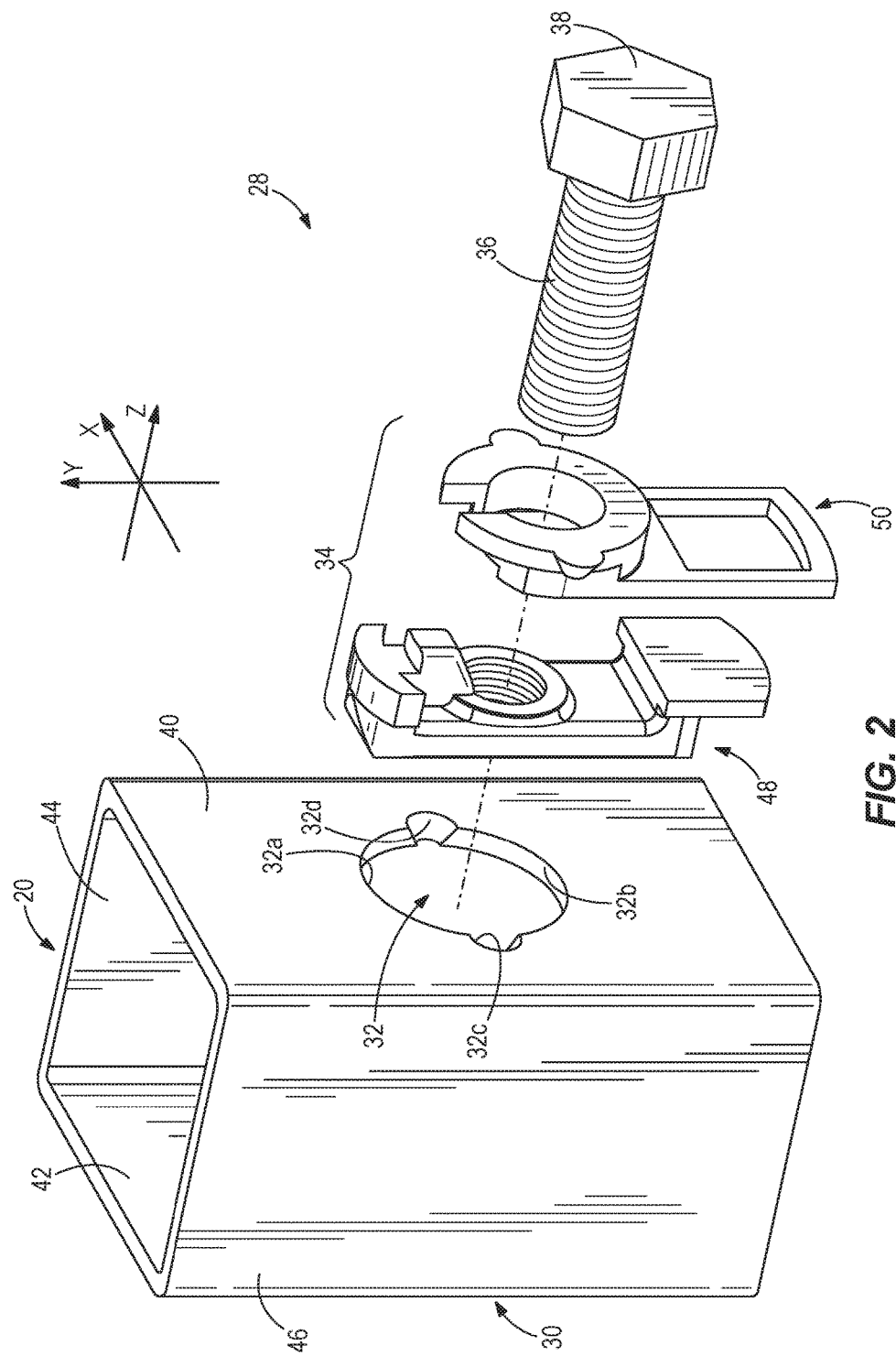
FIG. 2 is an exploded view of one embodiment of the connector assembly.
Figure 3:
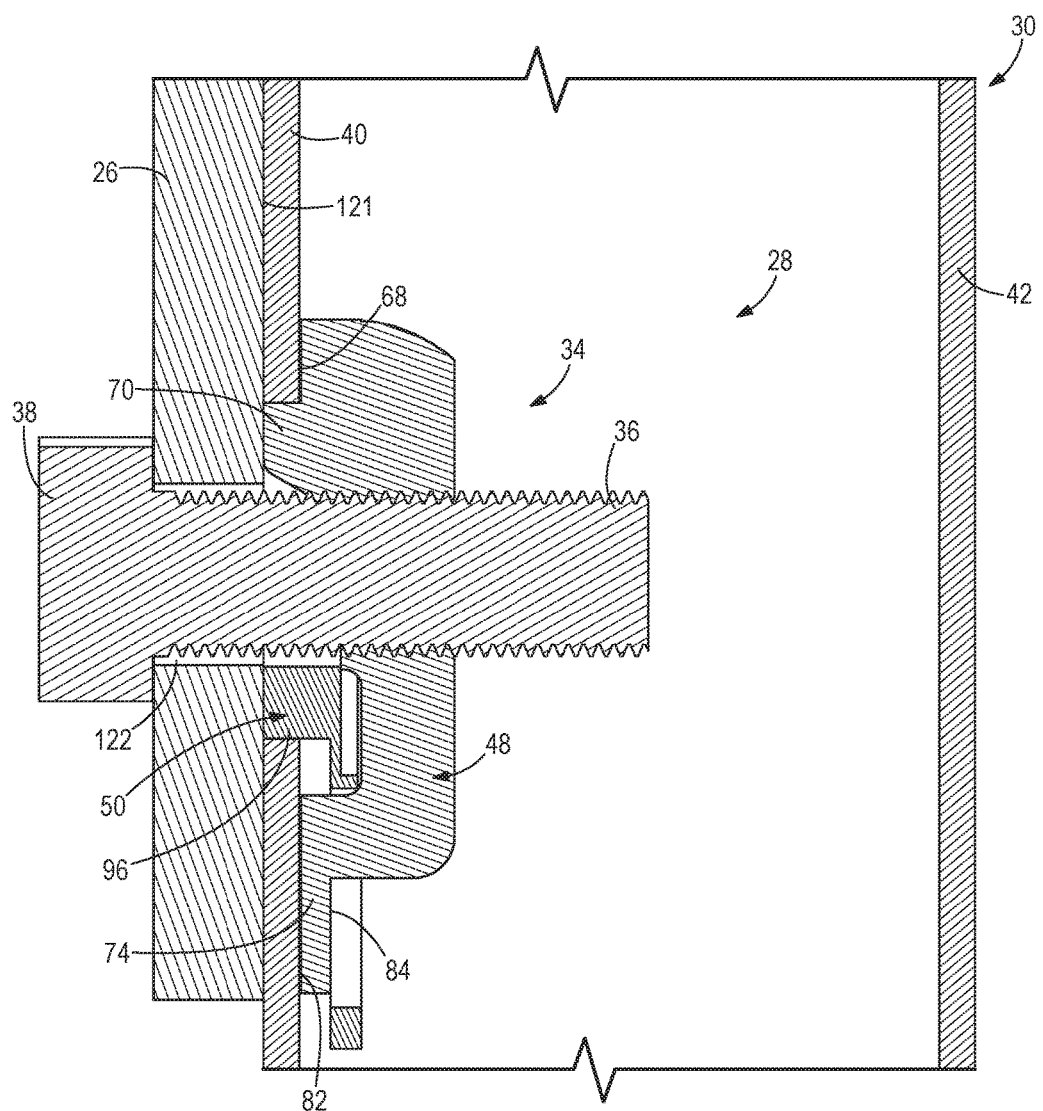
FIG. 3 is a sectional view of the joined element and connector assembly taken on line 3-3 of FIG. 1.

FIG. 2 depicts a connector assembly 28 according to the present disclosure including a base part 30 which in the exemplary embodiment is a rectangular tube that is part of the rear support column 20 shown in FIG. 1. It should be noted that the base part 30 may have a different configuration other than the rectangular tube shown and comprises at least one flat mounting face. The connector assembly 28, in this example, connects the support column 20 and the auxiliary support member 26. The configuration and function of the base part 30 and member 26 can vary. In other examples, the base part 30 can form part of the base frame member 22 or other portions of the weight rack 10. The base part 30 defines at least one throughhole 32 shaped and sized for receiving and retaining a two-piece connector device 34 relative to forming walls 32a, 32b, 32c, 32d of the throughhole 32. Forming walls 32a, 32b define upper and lower semi-circular segments connected to laterally extending, diametrically opposed forming walls 32c, 32d configured as frustoconically-shaped pockets for receiving and retaining corresponding ears on the connector device 34 as will be described further below. According to the present disclosure, the connector device 34 serves as a nut and receives a threaded end 36 of a bolt 38 to thereby connect the base part 30 as shown in FIG. 2, or the element 26 and the base part 30 as shown in FIGS. 1 and 3.

In the example shown in FIG. 2, a first embodiment of the connector assembly 28 includes a single throughhole 32 that receives the connector device 34 which is coupled to the bolt 38. The throughhole 32 is formed through a planar sidewall and front mounting face 40 of the base part 30. Additional throughholes 32 may be formed in mounting face 40 as well as an opposing planar sidewall and mounting face 42 of the base part 30 to permit further connection of an auxiliary support member to an opposite side of the support column 20. If desired, throughhole 32 could also be formed on opposing planar end walls and mounting faces 44, 46 of the base part 30. It should be appreciated that each throughhole 32 is located between and away from the adjacent corners of the base part 30 so as not to weaken the structural integrity thereof.

The connector device is formed with a rear portion 48 and a front portion 50 separate from the rear portion 48. The rear portion 48 and the front portion 50 each have a length extending in a longitudinal direction Y, a width extending in a lateral direction X that is perpendicular to the longitudinal direction Y and a height extending in a transverse direction Z that is perpendicular to the longitudinal direction Y and perpendicular to the lateral direction X. The rear portion 48 and the front portion 50 are sized and shaped and are retained together within the base part 30 such that neither rear portion 48 or the front portion 50 projects beyond the mounting face 40 of the base part 30.

As best seen in FIGS. 4-6, the rear portion 48 of the connector device 34 is a body formed with a base 52 extending in the longitudinal direction Y and having a planar front surface 54 and an outwardly curved rear surface 56. A circular crown 58 projects from the planar front surface 54 and is formed with an internally threaded throughhole 60 which extends completely through the rear portion 48 in the transverse direction Z. The base 52 of the rear portion 48 includes a first end 62 which defines a leading end, and a second end 64 opposite the first end which defines a trailing end. The first end 62 includes a curved front segment 66 which defines a first planar engagement surface 68. A driven element in the form of a projection 70 extends forwardly from the planar front surface 54 between the curved front segment 66 and a peripheral base portion of the crown 58. As best seen in FIG. 6, the projection 70 is formed with a camming sloping surface 72 configured to be engaged by a finger or the threaded end 36 of a bolt 38 during use of the connector assembly 28. The projection 70 also has side surfaces 73, 75 configured, to be slidably received within the front portion 50. A tab 74 is integrally formed on the second end 64, and provided with a curved outer surface 76 and a straight inner surface 78 that is connected by a curved wall 80 to the planar front surface 54. The curved outer surface 76 extends beyond the second end 64 in the longitudinal direction Y, and defines a second planar engagement surface 82. As seen in FIG. 6, the first planar engagement surface 68 is coplanar with the second planar engagement surface 82. The lower surface of tab 74 defines a third planar engagement surface 84.

Referring now to FIGS. 7-9, the front portion 50 of the connector device 34 is a body configured with a base 86 extending in the longitudinal direction Y, and having a stepped front face 88 and a planar rear face 90. The base 86 of the front portion 50 includes a curved front end 92 and a curved second end 94 opposite the curved first end 92. A cylindrical head 96 having a planar outer surface 97 projects forwardly from the stepped front face 88, and has a peripheral portion 98 which extends in the longitudinal direction Y beyond the curved first end 92. A slot 100 is formed in the curved first end 92 and the peripheral portion 98 of the head 96, and opens into an access opening 102 formed by a smooth inner wall 104 of the head 96. The slot 100 is configured to receive the projection 70 on the rear portion 48. In particular, walls 105 are designed to slidably receive the side walls 73, 75. If desired, walls 105 and side walls 73, 75 could be configured to have a frictional relationship therebetween. In the exemplary embodiment, a pair of diametrically opposed, frustoconically-shaped ears 106, 108 extends outwardly from the head 96 in the lateral direction X. The head 96 is designed to be matingly received within the forming walls 32a, 32b of the base part 30 with the ears 106, 108 being matingly received and retained in the forming walls 32c, 32d such that the planar outer surface 98 is flush with an outer surface of the mounting face 40 on the base part 30. The base 86 is further formed therethrough with a generally rectangular shaped recess 110 between the curved second end 94 and the cylindrical head 96. As seen in FIG. 7, the front face 88 includes side support surfaces 112, 114 and an end support surface 116 which are configured for engagement with the third planar engagement surface 84 defined by the tab 74 on the rear portion 48. As depicted in FIG. 8, the planar rear face 90 of the front portion 50 is formed with a recessed area 118 defined by a curved peripheral wall 120 and configured to receive the crown 58 on the rear portion 48.

In use, with the rear portion 48 and the front portion 50 oriented as shown in FIG. 10, the first (leading) end 62 of the rear portion 48 is inserted in the direction of arrow A through the recess 110 of the front portion 50. The tab 74 on the rear portion 48 is sized and shaped so that it will not pass through the recess 110. Then, as depicted in FIG. 11, the rear portion 48 is moved in the direction of arrow B behind the front portion 50 so that the projection 70 extends into the access opening 102 and the peripheral portion 98 of the head overlies the curved front segment 66 on the rear portion 48. Also, it should be noted from FIG. 11, that the tab 74 rests on the side support surfaces 112, 114 and the end support surface 116 of the front portion 50 with the curved outer surface 76 extending beyond the second end 94 of the front portion 50. Once the rear portion 48 and the front portion 50 are engaged together as shown in FIG. 11, the connector device 34 is formed and is ready for insertion into the throughhole 32 on the base part 30.

Figure 12:
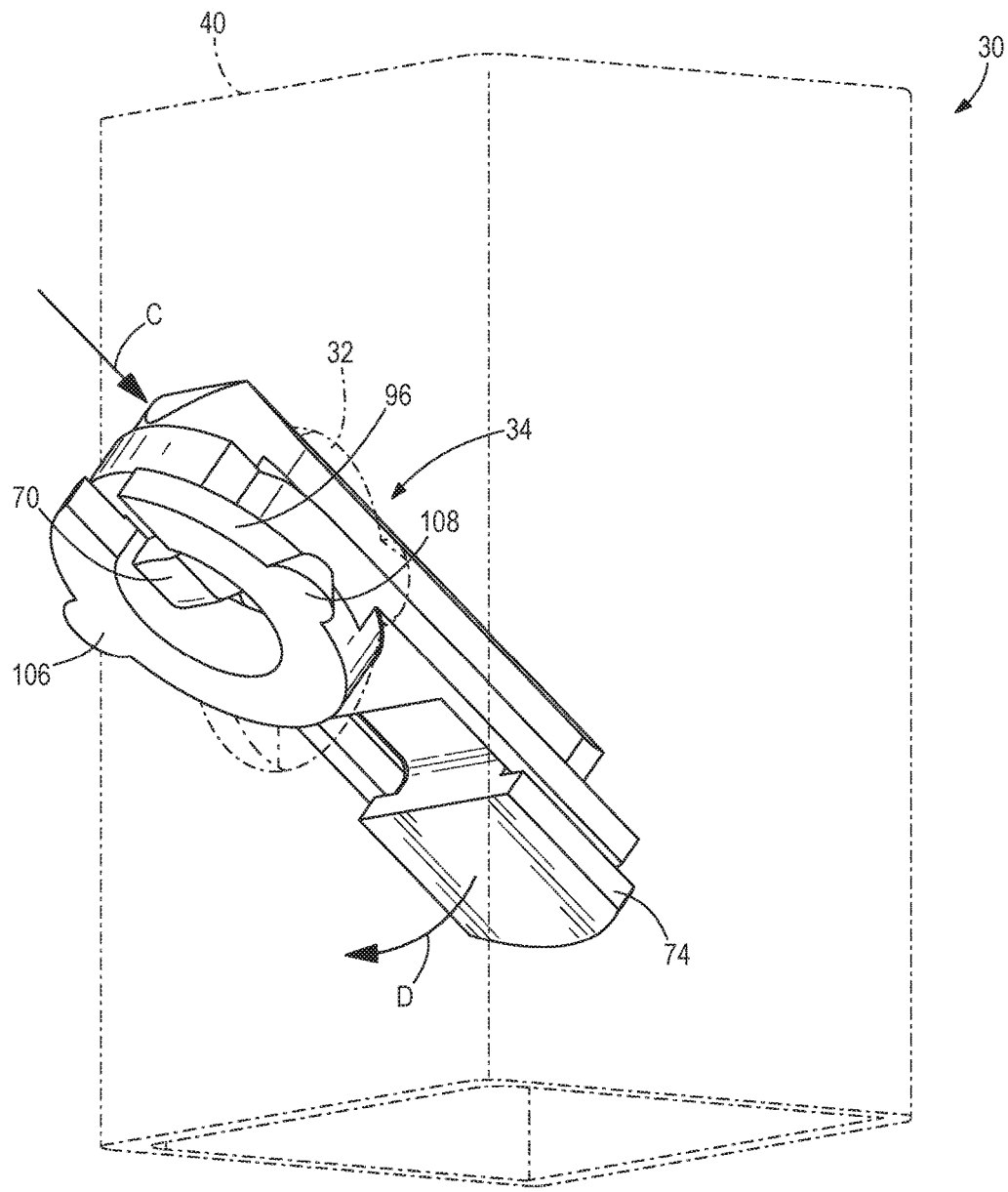
FIGS. 12-14 are perspective views illustrating the insertion, orientation and fastening of the connector assembly.
Figure 13:
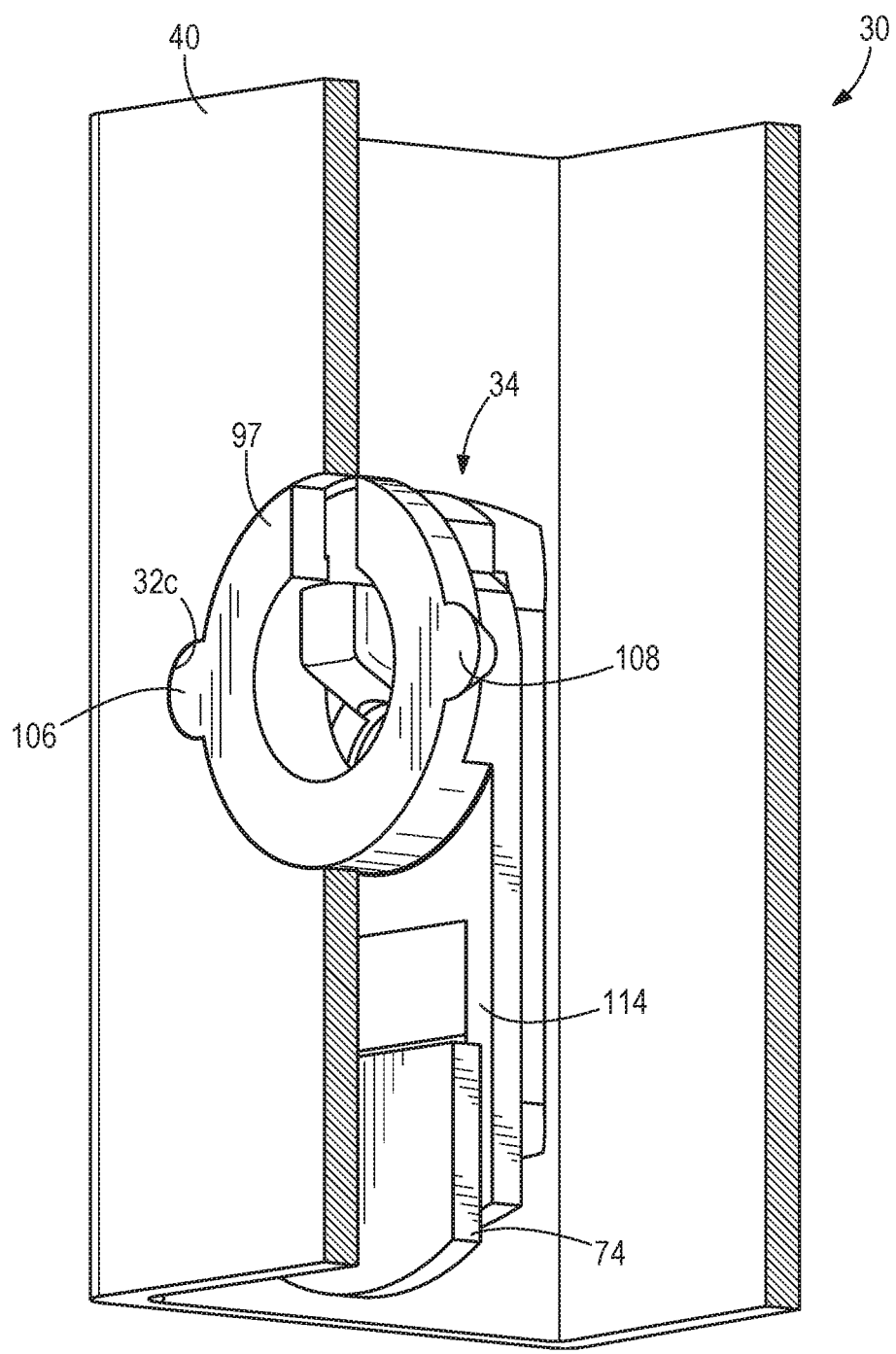

Referring now to FIG. 12, the connector device 34 is passed into the throughhole 32 in the direction of arrow C so that the end of the connector device 34 with the tab 74 is introduced into the interior of the base part 30, and then pivoted in the direction of arrow D towards an inner surface of the mounting face 40. The ears 106, 108 on the head 96 will prevent the passage of the connector device 34 completely through the throughhole 32. The end 62 will also prevent the device 34 from falling through the throughhole 32. The previous movement will cause the sidewall of the cylindrical head 96 to matingly engage with the forming walls 32a, 32b of the throughhole 32, and also cause the ears 106, 108 on the head 96 to be seated and frictionally retained in the forming walls 32c, 32d as partially shown in FIG. 13. It should be understood that the ears 106, 108 and the forming walls 32c, 32d are not limited to cooperating frustoconically-shaped engaging surfaces, and may be formed with other suitably shaped engaging surfaces which enable similar frictional retention of the ears 106, 108 relative to the forming surfaces 32c, 32c. In this installed position, the planar outer surface 97 on the head 96 does not project beyond the outer surface of mounting face 40 of the base part but lies flush therewith, and the remainder of the connector device 34 lies behind the inner surface of the mounting face 40 so that the entire connector device 34 is retained within the base part 30.

Figure 14:
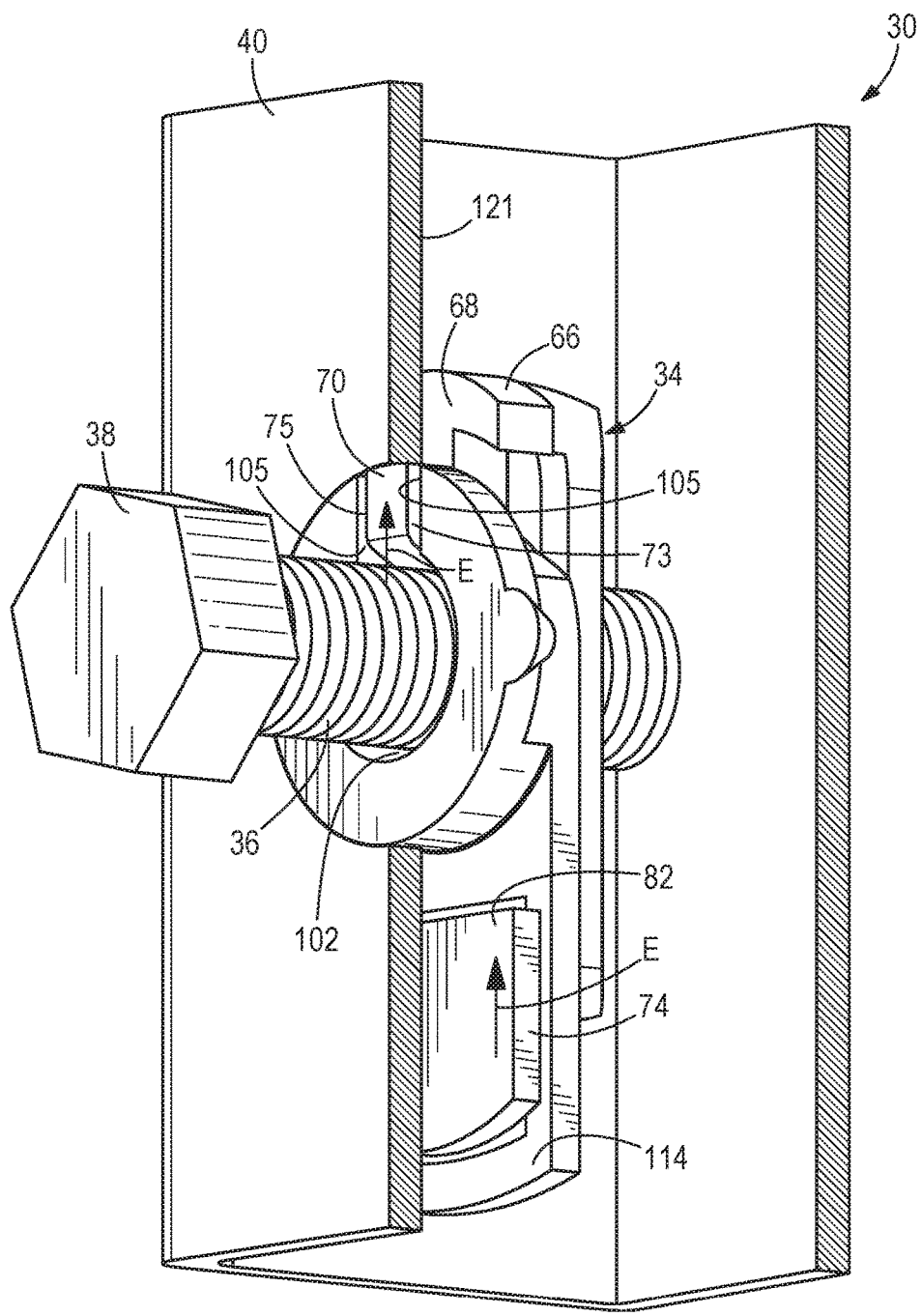

At this point, either a finger of the user or a threaded end 36 of the bolt 38 is placed within the access opening 102 so that it engages the camming surface 72 of the projection 70, and causes an initial sliding movement of the rear portion 48 relative to the front portion 50 so that the projection 70 enters the slot 100. More specifically, as shown in FIG. 14, progressive insertion of the bolt 38 through the access opening 102 further advances the projection 70 within the slot 100 so that the side walls 73, 75 are slidably received within the slot walls 105, and also moves the tab 74 along the side support surfaces 112, 114 in the direction of arrows E. As a result, the first planar surface 68 on the curved front segment 66 and the second planar engagement surface 82 on the tab 74 are slidably moved relative to the inner surface 121 of the mounting face 40 of the base part 30. The third planar surface 84 on the lower surface of tab 74 is slidably engaged with the side support surfaces 112, 114. At the same time, the crown 58 on the rear portion 48 slides within the recessed area 118 on the planar rear face 90 of the front portion 50 so that the threaded throughhole 60 is brought into engagement with the access opening 102. Now, the threaded portion 36 of the bolt 38 is turned into engagement in a threaded connection with the threaded throughhole 60 so that the bolt 38 is secured relative to the connector device 34 and the base part 30 drawing the rear portion 48 towards the mounting face 40 until the planar engagement surfaces 68, 82 are tightly engaged against the inner surface 121 of the mounting face 40. At this point, the connector device 34 is self-supported with the base part 30 so that there is no relative movement between the device 34 and the base part 30.

An example of use of the connector assembly 28 is shown in FIG. 3, wherein the threaded end 36 of the bolt 38 is passed through a hole 122 in the support element 26 and threaded into the connector device 34 as described above. Accordingly, the support element 26 can be conveniently and securely attached to the base part 30 without the need to extend the shaft 36 of the bolt 38 completely through the base part 30.

It should be appreciated that in the connector assembly 28, the throughhole 32 is particularly configured to both receive and retain the rear portion 48 and the front portion 50 within the base part 30 so that no part of the connector device 34 projects beyond the mounting face 40 of the base part 30.

FIGS. 15-18 illustrate a second embodiment of the connector assembly 28 wherein the base part 30 is formed with a circular throughhole 32 defined by a cylindrical forming wall 32a'. The head 90' on front portion 50' has an outer portion 90a provided with a pair of laterally extending ears 106', 108', and an inner portion 90b configured to be received within the throughhole 32'.

In use, the rear portion 48' and the front portion 50' are coupled together for sliding movement relative to one another and passed through the throughhole 32' in a manner as similarly described above. However, in this second embodiment, the head 90' is sized so that the outer portion 90a projects beyond the mounting face 40 and the ears 106', 108' rest upon the mounting face 40 and prevent the front portion 50' from falling through the throughhole 32'. The inner portion 90b of the head 90' is received within the circular forming wall 32a'. The rear portion 48' does not project beyond the mounting face 40. Once the connector device 34' is positioned relative to the base part 30, the bolt 38 is connected to the connector device 34' and the base part 30 as described above.

Figure 15:
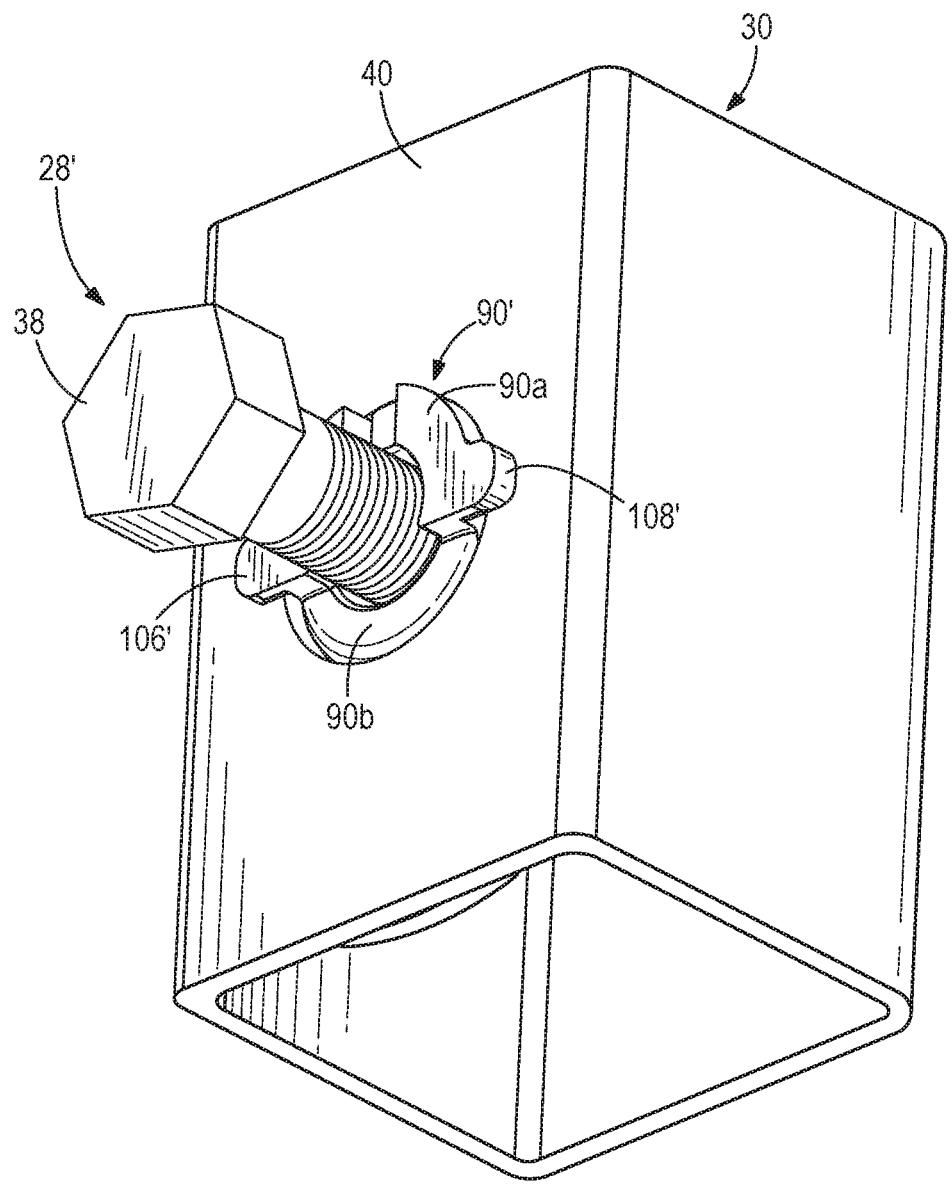
FIGS. 15-18 are perspective views of another embodiment of the connector assembly.
Figure 16:
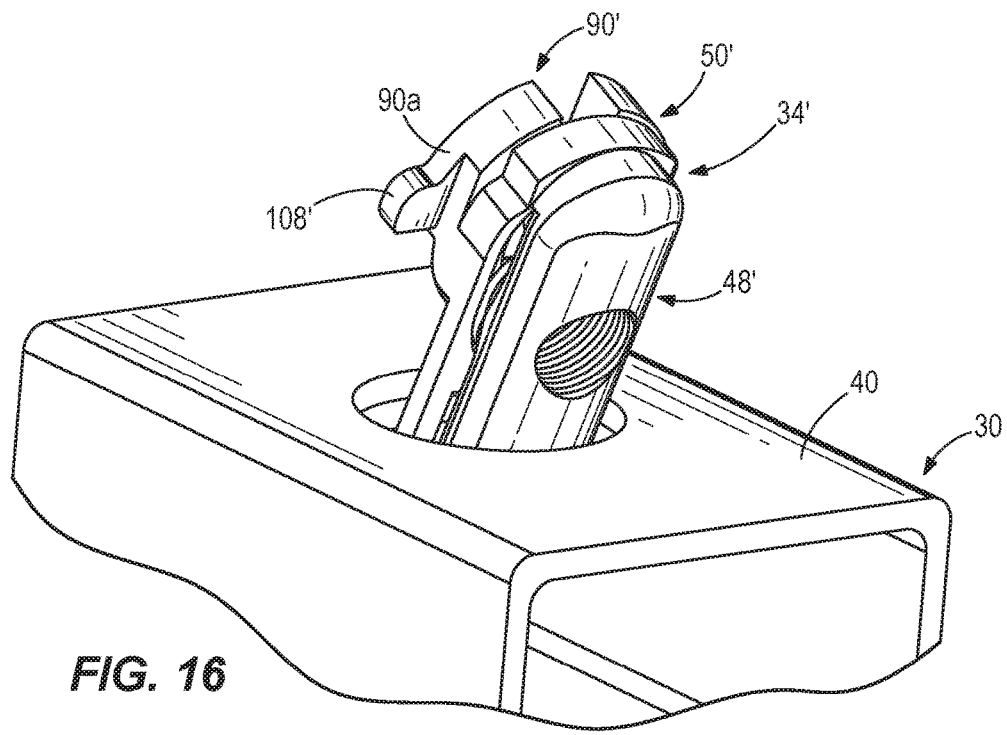
Figure 17:
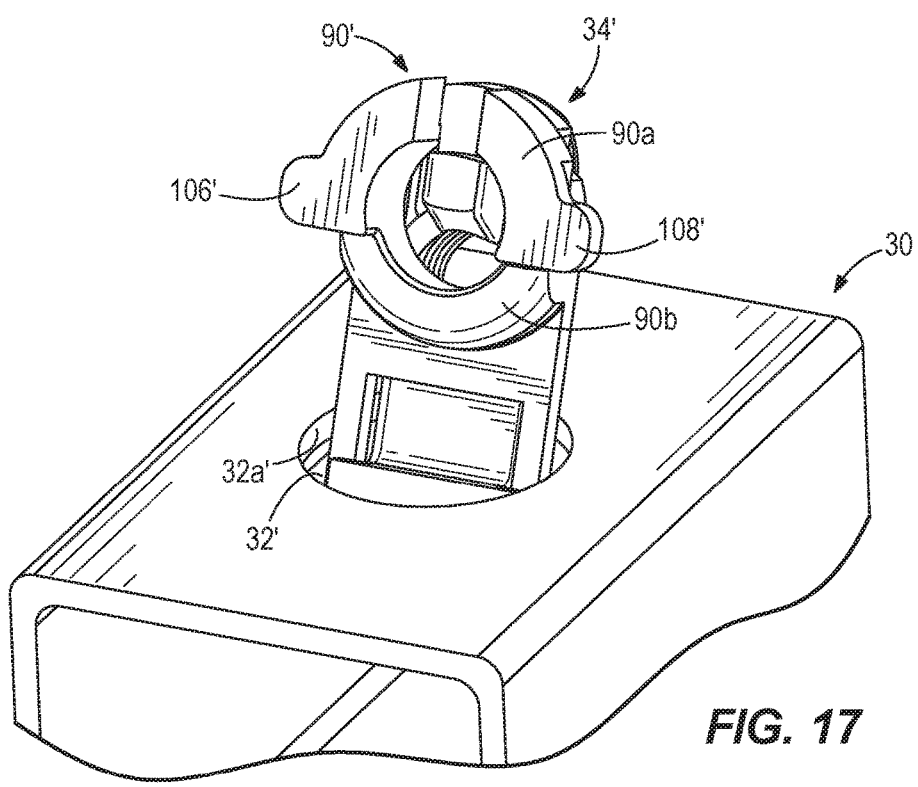
Figure 18:
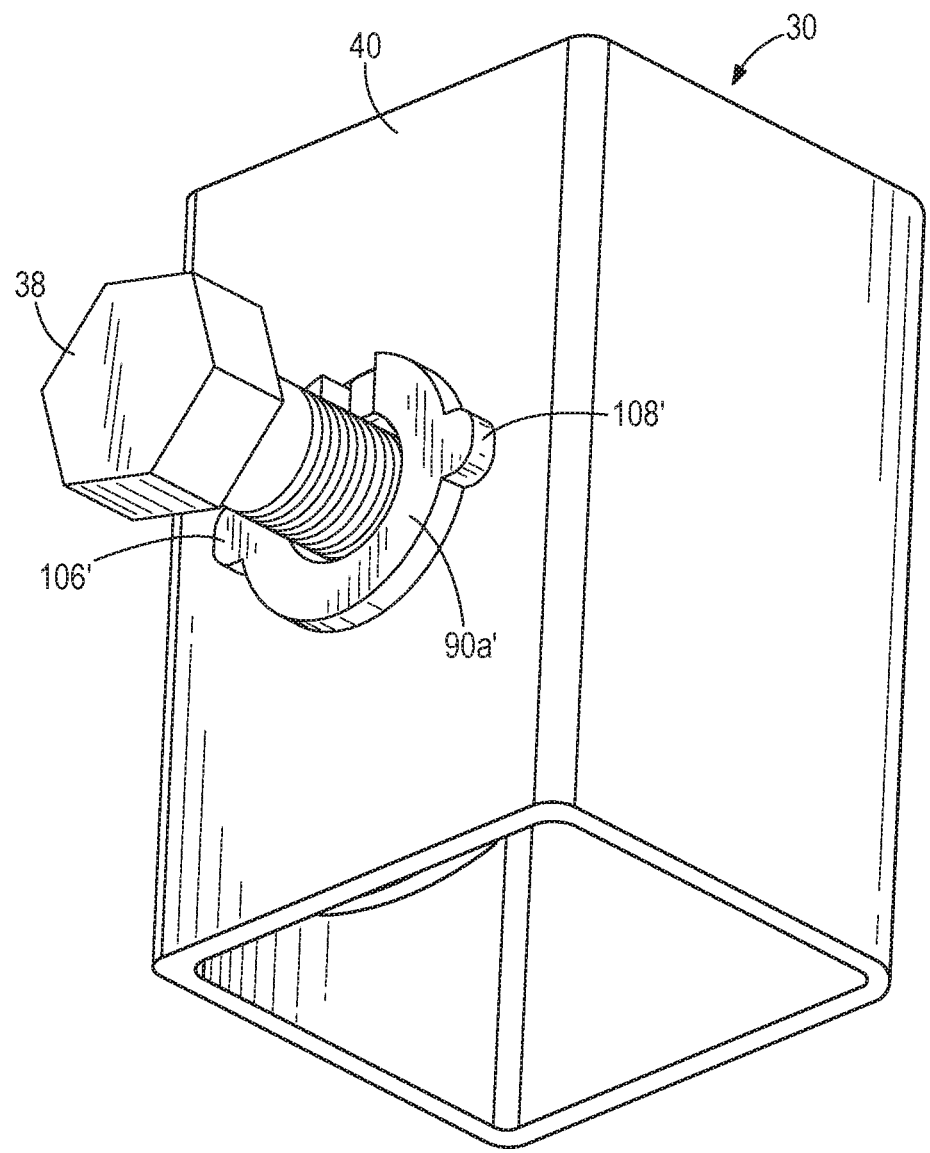

FIG. 18 is similar to FIGS. 15-17 but illustrates an enlarged outer head portion 90a' resting upon the mounting face 40.

As should be recognized by those skilled in the art, the present disclosure provides a connector assembly 28, 28' that can be mass produced, and eliminates the need for tools to install the connector device 34, 34' or to hold the connector device 34, 34' in place during connection of the support element 26 to the base part 30. In comparison with some prior art arrangements, the connector assembly 28, 28' of the present disclosure does not require forming a throughhole in a corner of a base part 30 so as to maintain the strength and appearance of the base part 30. In addition, the connector device 34, 34' can be formed so that it can be used on multiple gauge thicknesses of the base part 30. The connector device 34, 34' can be easily replaced in the field if it becomes lost or damaged, and is economical to manufacture thus lessening costs. The examples set forth herein advantageously provide modular attachments that form a replaceable threaded connection eliminating the need to replace an entire structural component when a threaded connector breaks down. The connector device 34, 34' is self-fixturing and self-aligning relative to the base part 30, thus providing efficiency and ease of use.

Although only a few examples have been described in detail above, those having ordinary skill in the art will readily appreciate that many modifications are possible in examples without materially departing from the invention. All such modifications are intended to be included within the scope of this disclosure as defined in the claims.

What is claimed is:

1. A connector device connecting an element to a base part including a mounting face provided with a throughhole having a forming wall structure via a bolt having a threaded end extending through the throughhole, the connector device comprising:
    a rear portion defining a bolt hole for engaging the bolt extending through the throughhole; and
    a front portion connected together with the rear portion such that there is relative movement between the rear portion and the front portion, the front portion having an access opening for receiving the bolt;
    the rear portion and the front portion being configured to be retained within the base part such that the rear portion does not project from the mounting face of the base part; and
    the rear portion being movable relative to the front portion such that the bolt hole is aligned with the access opening for receiving the threaded end of the bolt;
    wherein the rear portion includes a first end provided with a curved segment defining a first planar engagement surface, a second end provided with a tab defining a second planar engagement surface on one side of the tab and a third planar engagement surface on an opposite side of the tab;
    wherein the rear portion further includes a driven element located between the first end and the second end; and
    wherein the front portion includes a front face provided with a head which is received in the forming wall structure, and a slot formed in the head and opening into the access opening, the slot being configured to receive the driven element when the rear portion is moved relative to the front portion.

2. The connector device of claim 1, wherein the front portion further includes a recess for receiving the front end of the rear portion therethrough, the recess being at least partially surrounded by support surfaces engaged by the third planar engagement surface.

3. The connector device of claim 1, wherein the first planar engagement surface and the second planar engagement surface are engageable with an inner surface of the mounting face of the base part.

4. The connector device of claim 1, wherein the front portion includes a rear face provided with a recess for receiving the crown on the rear portion.

5. A connector device for connecting a threaded element to a base part via a throughhole in the base part, the connector device comprising:
    a front portion having an access opening that extends through the front portion; and
    a rear portion having a threaded bore that extends through the rear portion;
    wherein the rear portion is engaged with and slide-able with respect to the front portion and further wherein the front portion and rear portion are together insert-able into the throughhole such that at least part of the front and rear portions are located in the base part;
    the rear portion comprising a camming surface configured such that inserting the threaded element into the access opening causes the threaded element to engage and slide along the camming surface, which causes a planar engagement surface of the rear portion to slide transversely to the threaded element along a support surface of the front portion until the threaded bore becomes aligned with the access opening and with the threaded element;
    wherein the connector device is configured such that rotating the threaded element into engagement with the threaded bore causes the threaded element to become engaged with the base part via the connector device.

6. The connector device according to claim 5, wherein the rear portion comprises a front segment that is oppositely oriented with respect to the camming surface, the front segment being configured to engage the base part in the throughhole as the threaded bore becomes aligned with the access opening, as the threaded element is inserted into the access opening and engages and slides along the camming surface, thus engaging the connector device with the base part.

7. The connector device according to claim 5, wherein the front portion comprises a head with a peripheral portion that extends around the access opening and further comprising at least one ear that radially extends from the peripheral portion and is configured to engage with the base part when the front portion and rear portion are together inserted into the throughhole.

8. The connector device according to claim 5, wherein the rear portion comprises a front segment that is oppositely oriented with respect to the camming surface, the front segment being configured to engage the base part in the throughhole as the threaded bore becomes aligned with the access opening, as the threaded element is inserted into the access opening and engages and slides along the camming surface, thus engaging the connector device with the base part; and wherein the rear portion has a planar front surface that faces the front portion and wherein camming surface is located on a projection that projects from the planar front surface towards the front portion.

9. A connector device for connecting a threaded element to a base part via a throughhole in the base part, the connector device comprising:

a front portion having an access opening that extends through the front portion; and a rear portion having a threaded bore that extends through the rear portion;

wherein the rear portion is engaged with and slide-able with respect to the front portion and further wherein the front portion and rear portion are together insert-able into the throughhole such that at least part of the front and rear portions are located in the base part;

the rear portion comprising a camming surface configured such that inserting the threaded element into the access opening engages and slides along the camming surface, which causes the rear portion to slide along the front portion until the threaded bore becomes aligned with the access opening and with the threaded element;

wherein the connector device is configured such that rotating the threaded element into engagement with the threaded bore causes the threaded element to become engaged with the base part via the connector device; and wherein the rear portion has a planar front surface that faces the front portion and wherein the camming surface is located on a projection that projects from the planar front surface towards the front portion.

10. The connector device according to claim 9, wherein front portion comprises a head with a peripheral portion that extends around the access opening and a slot formed in the peripheral portion, wherein the projection moves within the slot when the threaded element is inserted into the access opening and engages and slides along the camming surface, which causes the rear portion to slide along the front portion.

11. A connector device for connecting a threaded element to a base part via a throughhole in the base part, the connector device comprising:

a front portion having an access opening that extends through the front portion; and a rear portion having a threaded bore that extends through the rear portion;

wherein the rear portion is engaged with and slide-able with respect to the front portion and further wherein the front portion and rear portion are together insert-able into the throughhole such that at least part of the front and rear portions are located in the base part;

the rear portion comprising a camming surface configured such that inserting the threaded element into the access opening engages and slides along the camming surface, which causes the rear portion to slide along the front portion until the threaded bore becomes aligned with the access opening and with the threaded element;

wherein the connector device is configured such that rotating the threaded element into engagement with the threaded bore causes the threaded element to become engaged with the base part via the connector device; and wherein the rear portion comprises a crown and wherein the front portion comprises a recessed area into which the crown is initially seated as the threaded element is inserted into the access opening and engages and slides along the camming surface, which causes the rear portion to slide along the front portion and the crown to slide into alignment with the access opening.

12. The connector device according to claim 11, wherein the recessed area has a curved peripheral wall.

13. The connector device according to claim 11, wherein the crown surrounds the threaded through-bore.

14. A connector device for connecting a threaded element to a base part via a throughhole in the base part, the connector device comprising:

a front portion having an access opening that extends through the front portion; and a rear portion having a threaded bore that extends through the rear portion;

wherein the rear portion is engaged with and slide-able with respect to the front portion and further wherein the front portion and rear portion are together insert-able into the throughhole such that at least part of the front and rear portions are located in the base part;

the rear portion comprising a camming surface configured such that inserting the threaded element into the access opening engages and slides along the camming surface, which causes the rear portion to slide along the front portion until the threaded bore becomes aligned with the access opening and with the threaded element;

wherein the connector device is configured such that rotating the threaded element into engagement with the threaded bore causes the threaded element to become engaged with the base part via the connector device; and wherein the front portion has a recess and wherein the rear portion has a tab that registers the rear portion in the recess, wherein the tab is configured to slide along the recess as the threaded element is inserted into the access opening engages and slides along the camming surface, which causes the rear portion to slide along the front portion.

15. The connector device according to claim 14, wherein the tab has a planar engagement surface that is configured to engage an interior wall of the base member when the front portion and rear portion are together inserted into the throughhole.

16. A connector device for connecting a threaded element to a base part via a throughhole in the base part, the connector device comprising:

a front portion having an access opening that extends through the front portion; and a rear portion having a threaded bore that extends through the rear portion;

wherein the rear portion is engaged with and slide-able with respect to the front portion and further wherein the front portion and rear portion are together insert-able into the throughhole such that at least part of the front and rear portions are located in the base part;

the rear portion comprising a camming surface configured such that inserting the threaded element into the access opening engages and slides along the camming surface, which causes the rear portion to slide along the front portion until the threaded bore becomes aligned with the access opening and with the threaded element;

wherein the connector device is configured such that rotating the threaded element into engagement with the threaded bore causes the threaded element to become engaged with the base part via the connector device;

wherein the rear portion comprises a front segment that is oppositely oriented with respect to the camming surface, the front segment being configured to engage the base part in the throughhole as the threaded bore becomes aligned with the access opening, as the threaded element is inserted into the access opening and engages and slides along the camming surface, thus engaging the connector device with the base part;

wherein the rear portion has a planar front surface that faces the front portion and wherein camming surface is located on a projection that projects from the planar front surface towards the front portion; and wherein front portion comprises a head with a peripheral portion that extends around the access opening and a slot formed in the peripheral portion, wherein the projection moves within the slot when the threaded element is inserted into the access opening and engages and slides along the camming surface, which causes the rear portion to slide along the front portion.

17. The connector device according to claim 16, further comprising at least one ear that radially extends from the peripheral portion and is configured to engage with the base part when the front portion and rear portion are together inserted into the throughhole.

18. The connector device according to claim 17, wherein the rear portion comprises an outwardly curved rear surface and wherein the front portion comprises a recessed area into which the outwardly curved surface is seated as the threaded element is inserted into the access opening and engages and slides along the camming surface, which causes the rear portion to slide along the front portion.

19. The connector device according to claim 18, wherein the front portion has a recess and wherein the rear portion has a tab that registers the rear portion in the recess, wherein the tab is configured to slide along the recess as the threaded element is inserted into the access opening engages and slides along the camming surface, which causes the rear portion to slide along the front portion.

20. A connector assembly comprising:
a base part;
a threaded element; and
a connector device that connects the threaded element to the base part via a throughhole in the base part;
wherein the connector device comprises a front portion having an access opening that extends through the front portion and a rear portion having a threaded bore that extends through the rear portion;
wherein the rear portion is engaged with and slide-able with respect to the front portion and further wherein the front portion and rear portion are together insert-able into the throughhole such that at least part of the front and rear portions are located in the base part;
the rear portion comprising a camming surface configured such that inserting the threaded element into the access opening causes the threaded element to engage and slide along the camming surface, which causes a planar engagement surface of the rear portion to slide transversely to the threaded element along a support surface of the front portion until the threaded bore becomes aligned with the access opening and with the threaded element; and
wherein the connector device is configured such that rotating the threaded element into engagement with the threaded bore causes the threaded element to become engaged with the base part via the connector device.

21. The connector assembly according to claim 20, wherein the front portion engaged with the base part such that the head lies flush with the base part.

22. The connector assembly according to claim 20, wherein the front portion is engaged with the base part such that the head protrudes above the base part.

23. The connector assembly according to claim 20, wherein the rear portion comprises a front segment that is oppositely oriented with respect to the camming surface, the front segment being configured to engage the base part in the throughhole as the threaded bore becomes aligned with the access opening, as the threaded element is inserted into the access opening and engages and slides along the camming surface, thus engaging the connector device with the base part.

24. A connector assembly comprising:
a base part;
a threaded element; and
a connector device that connects the threaded element to the base part via a throughhole in the base part;
wherein the connector device comprises a front portion having an access opening that extends through the front portion and a rear portion having a threaded bore that extends through the rear portion;
wherein the rear portion is engaged with and slide-able with respect to the front portion and further wherein the front portion and rear portion are together insert-able into the throughhole such that at least part of the front and rear portions are located in the base part;
the rear portion comprising a camming surface configured such that inserting the threaded element into the access opening engages and slides along the camming surface, which causes the rear portion to slide along the front portion until the threaded bore becomes aligned with the access opening and with the threaded element;
wherein the connector device is configured such that rotating the threaded element into engagement with the threaded bore causes the threaded element to become engaged with the base part via the connector device; and
wherein the rear portion has a planar front surface that faces the front portion and wherein the camming surface is located on a projection that projects from the planar front surface towards the front portion.

25. The connector assembly according to claim 24, wherein front portion comprises a head with a peripheral portion that extends around the access opening and a slot formed in the peripheral portion, wherein the projection moves within the slot when the threaded element is inserted into the access opening and engages and slides along the camming surface, which causes the rear portion to slide along the front portion.

* * * * *